(12) United States Patent
Matsumoto

(10) Patent No.: US 10,192,152 B2
(45) Date of Patent: Jan. 29, 2019

(54) DATA PROCESSING APPARATUS, DATA PROCESSING METHOD, AND NON-TRANSITORY COMPUTER READABLE MEDIUM

(71) Applicant: FUJI XEROX CO., LTD., Tokyo (JP)

(72) Inventor: Daisuke Matsumoto, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/244,238

(22) Filed: Aug. 23, 2016

(65) Prior Publication Data

US 2017/0200069 A1 Jul. 13, 2017

(30) Foreign Application Priority Data

Jan. 7, 2016 (JP) .................................. 2016-001482

(51) Int. Cl.
*G06K 15/02* (2006.01)
*H04N 1/417* (2006.01)

(52) U.S. Cl.
CPC ........... *G06K 15/184* (2013.01); *H04N 1/417* (2013.01); *H04N 2201/0094* (2013.01)

(58) Field of Classification Search
CPC ................ G06K 15/184; H04N 1/417; H04N 2201/0094; H04N 1/00954; H04N 1/21; H04N 1/40062; H04N 2201/214
USPC ......................................... 382/232–233, 239
See application file for complete search history.

(56) References Cited

U.S. PATENT DOCUMENTS

| | | | | |
|---|---|---|---|---|
| 5,524,198 A * | 6/1996 | Matsumoto | ........... | G06F 17/214 715/781 |
| 6,415,059 B1 * | 7/2002 | Saunders | ............... | H04N 19/60 348/390.1 |
| 8,139,082 B2 * | 3/2012 | Kitora | .................. | G06K 9/4604 345/581 |
| 8,275,402 B2 * | 9/2012 | Talty | ..................... | H04L 12/189 340/425.5 |
| 8,284,451 B2 * | 10/2012 | Misawa | ............... | H04N 1/6072 358/1.9 |
| 8,699,809 B2 * | 4/2014 | Oota | ........................ | G06K 9/48 345/442 |
| 9,697,631 B2 * | 7/2017 | Segawa | ..................... | G06T 5/30 |
| 9,698,824 B2 * | 7/2017 | Ichien | ................... | G06F 3/0613 |
| 2007/0258116 A1 * | 11/2007 | Matsumoto | ........ | H04N 1/32496 358/500 |
| 2009/0086817 A1 * | 4/2009 | Matsuoka | ............ | H04N 19/172 375/240.12 |

(Continued)

FOREIGN PATENT DOCUMENTS

| | | |
|---|---|---|
| JP | 10-13686 A | 1/1998 |
| JP | 2003-347927 A | 12/2003 |
| JP | 2004-112351 A | 4/2004 |

*Primary Examiner* — Iman K Kholdebarin
(74) *Attorney, Agent, or Firm* — Sughrue Mion, PLLC

(57) ABSTRACT

A data processing apparatus selects a processing scheme for target data from among candidates by using a degree of compression of the target data as an index, and performs data processing on the target data by using the selected processing scheme. The candidates include a processing scheme in which data which has been compressed is subjected to the data processing, and a processing scheme in which data is expanded and then subjected to the data processing.

14 Claims, 10 Drawing Sheets

(56) References Cited

U.S. PATENT DOCUMENTS

| | | | | |
|---|---|---|---|---|
| 2010/0095108 A1* | 4/2010 | Kameyama | ............... | H04L 9/00 713/150 |
| 2015/0293700 A1* | 10/2015 | Sasaki | ..................... | G06F 3/061 711/113 |
| 2017/0200069 A1* | 7/2017 | Matsumoto | .......... | G06K 15/184 |

* cited by examiner

FIG. 2

(1) EXEMPLARY DATA 1

RASTER FORMAT   PIXEL VALUE   [A][A][A][A][A][A][B][B]

VECTOR FORMAT   PIXEL VALUE   [A][B]
                RUN LENGTH    [5][3]

VECTORIZATION RATIO = (8 − 2)/8 = 75%

(2) EXEMPLARY DATA 2

RASTER FORMAT   PIXEL VALUE   [A][C][A][C][A][D][B][C]

VECTOR FORMAT   PIXEL VALUE   [A][C][A][C][A][D][B][C]
                RUN LENGTH    [1][1][1][1][1][1][1][1]

VECTORIZATION RATIO = (8 − 8)/8 = 0%

* VECTORIZATION RATIO = (THE NUMBER OF PIXELS IN RASTER FORMAT − THE NUMBER OF PIXELS IN VECTOR FORMAT)/
  THE NUMBER OF PIXELS IN RASTER FORMAT

DATA PROCESSING APPARATUS, DATA PROCESSING METHOD, AND NON-TRANSITORY COMPUTER READABLE MEDIUM

CROSS-REFERENCE TO RELATED APPLICATIONS

This application is based on and claims priority under 35 U.S.C. 119 from Japanese Patent Application No. 2016-001482 filed Jan. 7, 2016.

BACKGROUND (i) Technical Field

The present invention relates to a data processing apparatus, a data processing method, and a non-transitory computer readable medium.

(ii) Related Art

Data processing apparatuses have been widely available in various fields. In particular, image processing apparatuses which process image data are one of suitable examples of the data processing apparatuses. Heretofore, some techniques for the data processing apparatuses and the image processing apparatuses have been proposed.

SUMMARY

According to an aspect of the invention, there is provided a data processing apparatus that selects a processing scheme for target data from among candidates by using a degree of compression of the target data as an index, and that performs data processing on the target data by using the selected processing scheme. The candidates include a processing scheme in which data which has been compressed is subjected to the data processing, and a processing scheme in which data is expanded and then subjected to the data processing.

BRIEF DESCRIPTION OF THE DRAWINGS

Exemplary embodiment of the present invention will be described in detail based on the following figures, wherein:

FIG. 2 is a diagram for describing data formats of image data;

DETAILED DESCRIPTION

Figure 1:
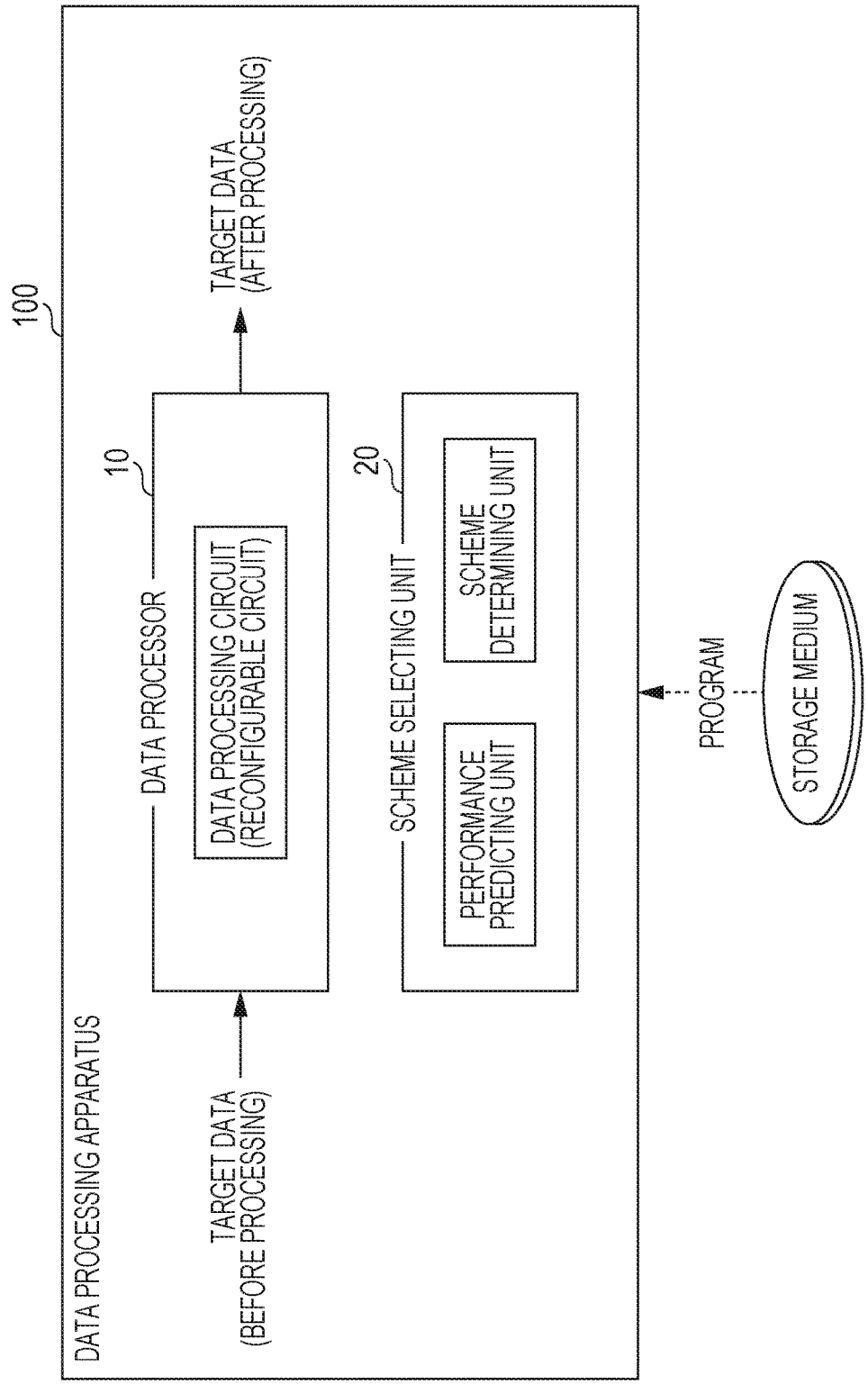
FIG. 1 is a diagram illustrating an exemplary data processing apparatus that is desirable for an exemplary embodiment of the present invention.

FIG. 1 is a diagram illustrating an exemplary data processing apparatus 100 that is desirable for an exemplary embodiment for carrying out the present invention. The data processing apparatus 100 in FIG. 1 includes a data processor 10 which performs data processing on target data (data to be processed), and a scheme selecting unit 20 which selects a processing scheme with which data processing is performed on the target data.

A desirable example of the target data which is to be processed by the data processing apparatus 100 in FIG. 1 is image data (including data containing only characters, numbers, and symbols) or the like. For example, image data is transmitted from an external apparatus such as a computer to the data processing apparatus 100.

Alternatively, the data processing apparatus 100 in FIG. 1 may be integrated into an image processing apparatus provided with an image reading function (scan function) and the like, and image data obtained from a medium such as paper by using the image reading function may be used as the target data. Further, an image corresponding to image data obtained after processing performed by the data processing apparatus 100 may be printed on paper or the like, or image data obtained after the processing may be supplied to an external apparatus. Desirable examples of the image processing apparatus include a copier, a printer, and a facsimile (fax). Further, a multi-function device provided with multiple functions that are among a copier function, a printer function, and a facsimile function is also a desirable example of the image processing apparatus.

The data processor 10 performs data processing on the target data. In the example illustrated in FIG. 1, the data processor 10 includes a data processing circuit having a circuit configuration corresponding to the data processing. The data processing circuit may be implemented by using a device implementing a fixed, not programmable, circuit configuration, such as an application specific integrated circuit (ASIC). However, it is desirable that the circuit configuration be implemented by using a programmable and reconfigurable circuit.

A reconfigurable circuit is a circuit for which the internal circuit configuration is reconfigurable (programmable). For example, a dynamic reconfigurable processor (DRP) is one of desirable devices for implementing a reconfigurable circuit. As a matter of course, another device, for example, a programmable logic circuit, such as a programmable logic device (PLD) or a field programmable gate array (FPGA), may be used to implement a reconfigurable circuit. Further, a dynamically reconfigurable device (processor or the like) which will be available in the future may be used to implement a reconfigurable circuit. The above-described processors or devices for implementing the internal configuration (for example, the data processing circuit) of the data processor 10 are merely examples. Other hardware may be used.

The scheme selecting unit 20 selects a processing scheme with which data processing is performed on the target data. In the example in FIG. 1, the scheme selecting unit 20 includes a performance predicting unit and a scheme determining unit. Exemplary processes performed by the scheme selecting unit 20 will be described in detail below.

At least part of the internal configuration provided for the data processing apparatus 100 in FIG. 1 may be constituted, for example, by hardware for implementing a calculation function and the like, and software (such as control programs) defining operations of the hardware, and may be implemented through collaboration between the hardware and the software. For example, the functions of the scheme selecting unit 20 may be implemented by using a computer. In this case, for example, programs for implementing an algorithm which corresponds to the functions of the scheme selecting unit 20 and which is described in detail below are stored in a computer-readable storage medium, such as a disk or a memory, and are supplied to a computer (data processing apparatus 100) via the storage medium. As a matter of course, the programs may be supplied to a computer through a telecommunication line such as the Internet. The hardware resource, such as a central processing unit (CPU) and a memory, which is included in the computer collaborates with the supplied programs (software), whereby, for example, the functions of the scheme selecting unit 20 are implemented. The functions of the data processor 10 may be implemented by using the computer. The data processor 10 may be disposed outside the computer implementing the functions of the scheme selecting unit 20, and the computer may be used to build a system of controlling the data processor 10.

The overall configuration of the data processing apparatus 100 in FIG. 1 is described above. Exemplary processes or functions implemented by the data processing apparatus 100 will be described. For the configuration (units denoted by reference numerals) illustrated in FIG. 1, the reference numerals in FIG. 1 are used in the description below.

FIG. 2 is a diagram for describing data formats of image data. FIG. 2 illustrates data formats of image data that is a desirable example of the target data which is to be processed by the data processing apparatus 100. That is, exemplary image data in raster format and exemplary image data in vector format are illustrated.

Image data in raster format has a data structure in which the pixel values of multiple continuous pixels in the image data are arranged in the order of the arrangement of the pixels. In contrast, image data in vector format is constituted by combinations of a pixel value and its run length, each of which describes multiple pixels. A run length in vector format indicates the number of continuous pixels having the same pixel value in image data. That is, a combination of a pixel value and its run length indicates that pixels, the number of which is equal to the run length and which correspond to the pixel value, are continuously arranged.

For example, exemplary data 1 describes image data in which the pixel values of multiple continuous pixels are AAAAABBB from the left. The data processing (image processing) is sequentially performed on image data, for example, starting from the pixel on the right. In raster format, according to the arrangement in image data, the pixel values of multiple pixels are arranged as AAAAABBB from the left. In contrast, in vector format, multiple continuous pixels having the same pixel value are combined together into a combination of the pixel value and its run length. In exemplary data 1, five pixels having a pixel value of A are continuously arranged, and three pixels having a pixel value of B are continuously arranged. In vector format, the data has a structure of the pixel value A×a run length of 5 and the pixel value B×a run length of 3.

In exemplary data 1, image data that is constituted by eight pixel values in raster format is compressed into two pixel values in vector format. Therefore, a vectorization ratio serving as an index indicating the degree of compression from raster format to vector format is defined as follows. In exemplary data 1, the vectorization ratio is 75%.

Vectorization ratio=(The number of pixels in raster format−The number of pixels in vector format)/ The number of pixels in raster format In contrast, exemplary data 2 describes image data in which the pixel values of multiple continuous pixels are ACACADBC from the left. In raster format, according to the arrangement in the image data, the pixel values of multiple pixels are arranged as ACACADBC from the left. In contrast, in vector format, multiple continuous pixels having the same pixel value are combined together into a combination of the pixel value and its run length. However, in exemplary data 2, since continuous pixels having the same pixel value are not present, the pixel values of the multiple pixels have failed to be compressed and still remain ACACADBC from the left in vector format. Therefore, in exemplary data 2, the vectorization ratio is 0%.

In some data processing, e.g., some image processing in which image data is to be processed, vector format has an advantage over raster format in terms of data processing performance. Specifically, in image processing in which a processing result is obtained from the pixel value of each pixel, e.g., look up table (LUT) processing such as gamma correction, execution using vector format is faster than execution using raster format.

For example, in the case of image processing in which one pixel value is processed in one clock cycle, in exemplary data 1, processing on image data in raster format which is constituted by eight pixel values requires eight clock cycles. In contrast, processing on image data in vector format which has been compressed into two pixel values requires two clock cycles. This is because, in the case of image data in vector format, the processing result for each pixel value is copied, for use, multiple times, the number of which is equal to the run length of the pixel value. When data obtained after processing is to be transferred to, for example, a dynamic random access memory (DRAM), if the data has been compressed from raster format into vector format, the transfer band in vector format may be smaller than that in raster format, achieving another advantage in terms of data transfer.

However, depending on the condition of compression from raster format to vector format, vector format may have a disadvantage over raster format in terms of data processing performance. For example, in the above-described example, i.e., in the case of the image processing in which one pixel value is processed in one clock cycle, in exemplary data 2, processing on image data in raster format which is constituted by eight pixel values requires eight clock cycles. Similarly, processing on image data in vector format which is still constituted by eight pixel values which have failed to be compressed requires eight clock cycles. Therefore, no increases in speed of the processing are expected. In addition, in exemplary data 2, the amount of data in vector format is larger than that in raster format by data for run length, which is not desirable in terms of data transfer.

Typically, there is a tendency in which, as the vectorization ratio is higher, vector format has a bigger advantage in terms of data processing performance, and in which, in contrast, as the vectorization ratio is lower, raster format has a bigger advantage in terms of data processing performance.

Figure 3:
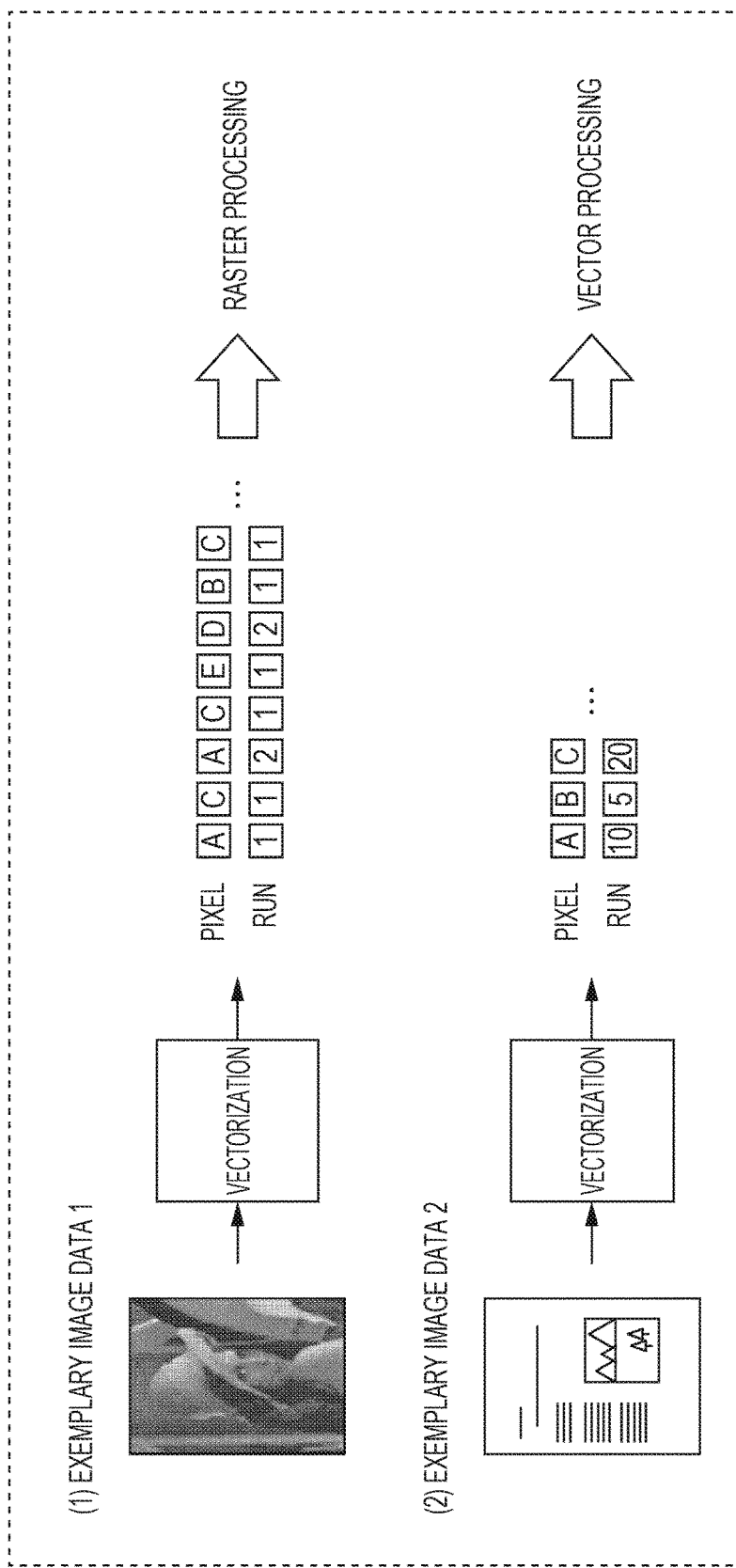
FIG. 3 is a diagram illustrating exemplary image data.

FIG. 3 illustrates a diagram illustrating exemplary image data. Exemplary image data 1 is image data, for example, containing a large amount of photograph data and the like. Since the continuity of pixels having the same pixel value is low, exemplary image data 1 is difficult to compress into a vector, resulting in a relatively low (small) vectorization ratio. Therefore, in the case of exemplary image data 1, raster format tends to have an advantage in terms of data processing performance.

In contrast, exemplary image data 2 is image data, for example, containing a large amount of blank data, character data, and the like. Since the continuity of pixels having the same pixel value is high, exemplary image data 2 is easy to compress into a vector, resulting in a relatively high (large) vectorization ratio. Therefore, in the case of exemplary image data 2, vector format tends to have an advantage in terms of data processing performance.

When data in vector format is subjected to data processing while the data remains in vector format, the data processing may cause the data in vector format to be changed, resulting in a change in vectorization ratio. For example, when vector image processing is applied to image data in vector format, a change in pixel value which is caused by the image processing may cause a run length in the vector to be divided, resulting in a decrease in vectorization ratio. In this case, to improve the vectorization ratio, it is desirable to perform re-vectorization processing.

Figure 4:
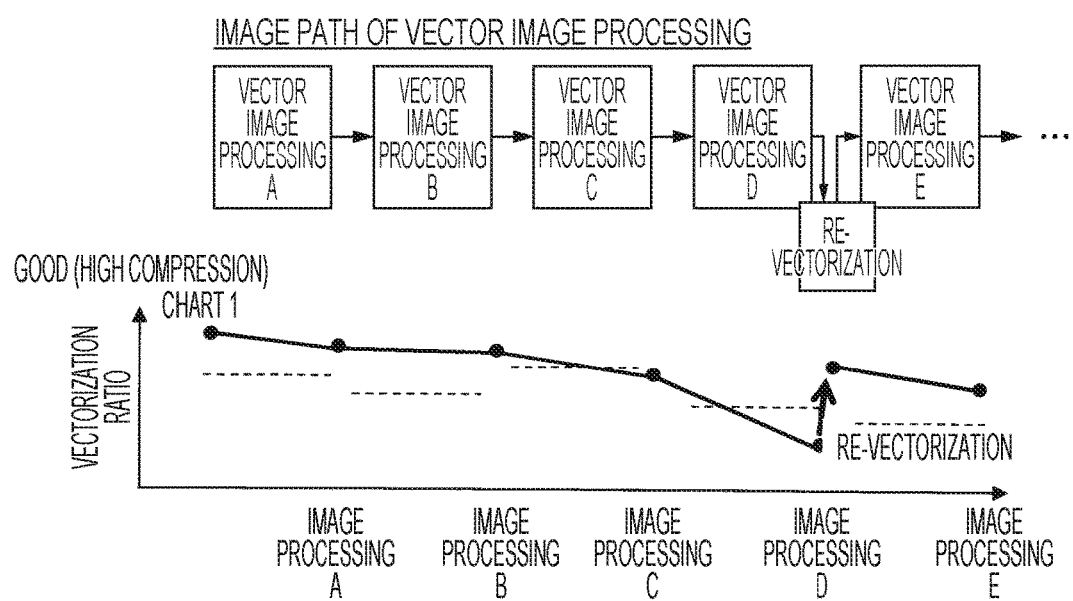
FIG. 4 is a diagram for describing re-vectorization processing.

FIG. 4 is a diagram for describing re-vectorization processing. FIG. 4 illustrates an exemplary state in which the vectorization ratio of processed image data is changed due to vector image processing operations A to E performed in multiple stages.

In the example in FIG. 4, as a result obtained by performing the vector image processing operations A to D, the vectorization ratio for the target data is gradually decreased. When the vectorization ratio is decreased, vector image processing tends to have a disadvantage in terms of data processing performance. Therefore, re-vectorization processing of combining divided vectors together is performed. In the example in FIG. 4, after the vector image processing D, the re-vectorization processing is performed so that the vectorization ratio for the target data is improved. Then, the vector image processing E is performed.

Figure 5:
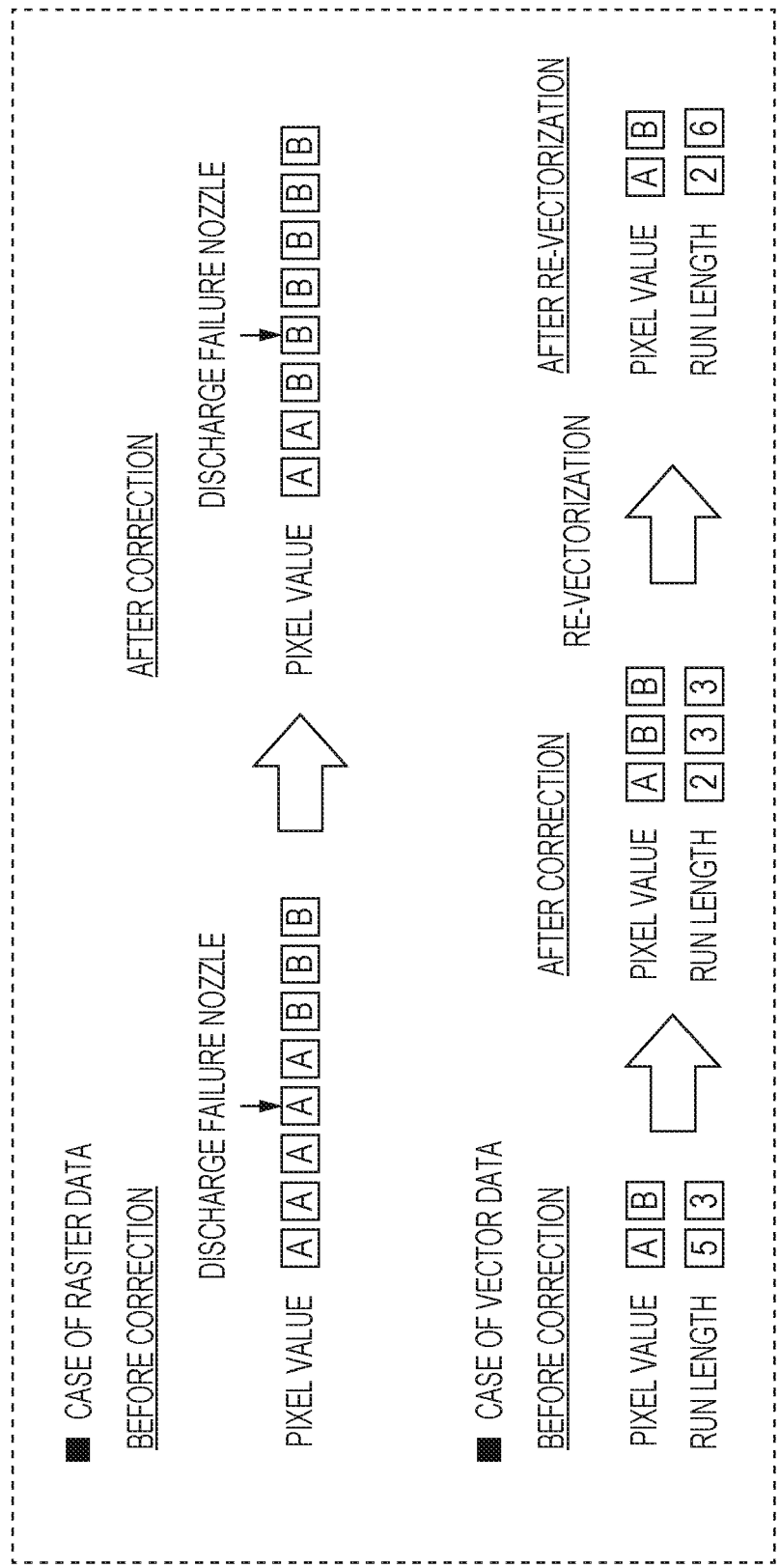
FIG. 5 is a diagram illustrating exemplary re-vectorization processing.

FIG. 5 is a diagram illustrating an exemplary re-vectorization processing. FIG. 5 illustrates image data subjected to discharge failure correction which is exemplary image processing. In discharge failure correction, to alleviate or eliminate an adverse effect produced in printing by a discharge failure nozzle which is incapable of discharging ink due to a failure or the like, the pixel values of pixels (for example, the previous and next pixels) close to the pixel corresponding to the discharge failure nozzle are modified (for example, the pixel values are increased).

FIG. 5 illustrates exemplary discharge failure correction performed on image data in which the pixel values of multiple continuous pixels are AAAAABBB from the left. In the example in FIG. 5, the pixel which corresponds to a pixel value of A and which is the fourth pixel from the left corresponds to the discharge failure nozzle. The discharge failure correction causes the three pixels including the next and previous pixels to be corrected from a pixel value of A to a pixel value of B.

In the example in FIG. 5, for image data (raster data) in raster format, data which is data before correction and in which the pixel values are arranged as AAAAABBB is corrected to AABBBBBB through the discharge failure correction. The number of pixel values in the image data in raster format is not changed before and after the correction.

In contrast, for image data (vector data) in vector format, the data structure of the pixel value A×a run length of 5 and the pixel value B×a run length of 3 before the correction is corrected to the data structure of the pixel value A×a run length of 2, the pixel value B×a run length of 3, and the pixel value B×a run length of 3 through the discharge failure correction. That is, a vector of the pixel value A×a run length of 5 is converted into the pixel value A×a run length of 2 and the pixel value B×a run length of 3 through the discharge failure correction.

Therefore, after image processing performed on image data in vector format, the re-vectorization processing is performed if necessary. In the example in FIG. 5, the re-vectorization processing is performed after the discharge failure correction performed on image data in vector format. That is, the vector of the pixel value B×a run length of 3 which is generated through the discharge failure correction is adjacent to the vector of the pixel value B×a run length of 3 which is a vector before the correction. Therefore, these vectors are combined into a vector of the pixel value B×a run length of 6.

If the re-vectorization processing causes the vectorization ratio to be improved, it is expected that the data processing performance in vector image processing after that is improved. However, in some condition of image data, for example, in the case where the vectorization ratio is very low (small), it may be impossible to expect that even re-vectorization processing causes the vectorization ratio to be substantially improved. In this case, it is desirable that raster image processing having an advantage over vector image processing be used.

Figure 6:
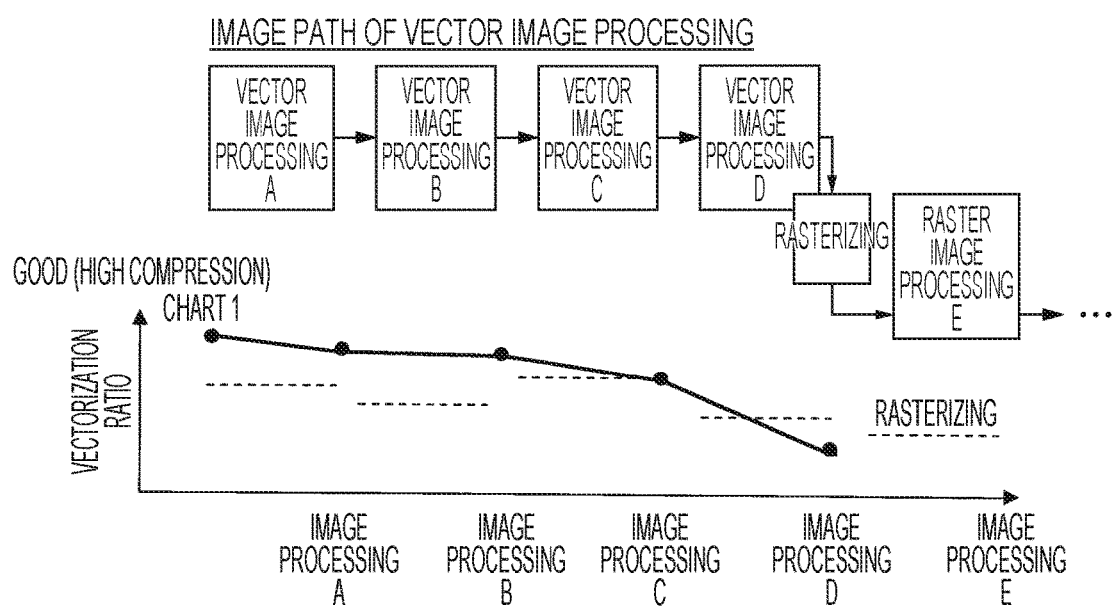
FIG. 6 is a diagram for describing raster image processing.

FIG. 6 is a diagram for describing raster image processing. FIG. 6 illustrates an exemplary state in which the vectorization ratio of processed image data changes through image processing operations A to E performed in multiple stages.

In the example in FIG. 6, as a result of execution of the vector image processing operations A to D, the vectorization ratio of the target data is gradually decreased. If the vectorization ratio is decreased, vector image processing tends to have a disadvantage in terms of data processing performance. In some state of image data, for example, in the case where the vectorization ratio is very low (small), it may be impossible to expect that even re-vectorization processing causes the vectorization ratio to be substantially improved. In this case, raster image processing which has an advantage over vector image processing is used.

In the example in FIG. 6, after the vector image processing D, image data in vector format is expanded into image data in raster format through rasterisation (rasterizing) processing. Then, the raster image processing E is performed.

Figure 7:
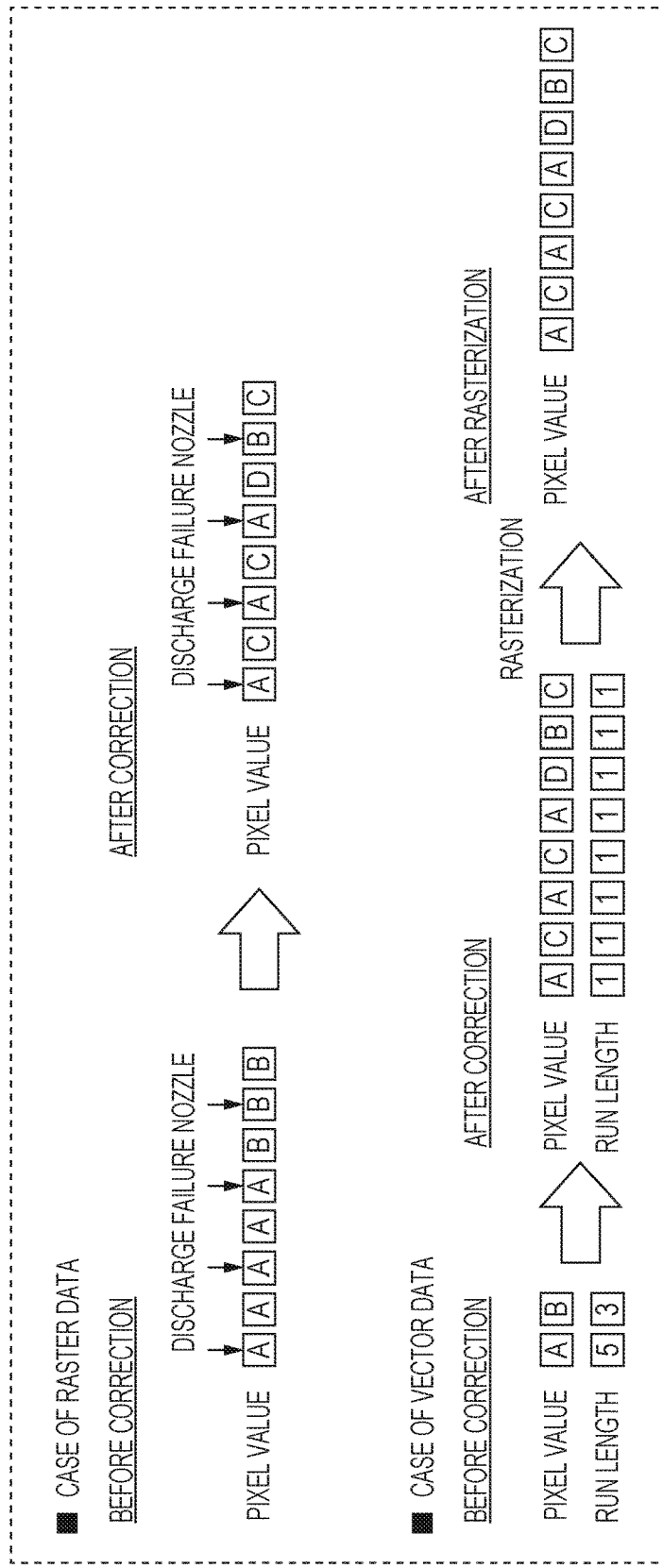
FIG. 7 is a diagram illustrating exemplary raster image processing.

FIG. 7 is a diagram illustrating exemplary raster image processing. FIG. 7 illustrates image data subjected to discharge failure correction which is exemplary image processing. That is, exemplary discharge failure correction performed on image data in which the pixel values of multiple continuous pixels are AAAAABBB from the left is illustrated. In the example in FIG. 7, the four odd-numbered pixels from the left correspond to discharge failure nozzles, and the previous and next pixels of each of the pixels are corrected through the discharge failure correction.

In the example in FIG. 7, for image data (raster data) in raster format, data which is data before the correction and in which the pixel values are arranged as AAAAABBB is corrected to ACACADBC through discharge failure correction. The number of pixel values in the image data in raster format is not changed before and after the correction.

In contrast, for image data (vector data) in vector format, the data structure of the pixel value A×a run length of 5 and the pixel value B×a run length of 3 before the correction is divided into eight vectors, for each of which has a run length of 1, through the discharge failure correction, resulting in a vectorization ratio of 0. In addition, after the correction, since there are no adjacent pixels having the same pixel value, even when the re-vectorization processing (FIG. 5) is performed, the vectorization ratio is not improved.

Therefore, after image processing performed on image data in vector format, rasterisation is performed if necessary. In the example in FIG. 7, after the discharge failure correction performed on image data in vector format, rasterisation is performed, and image data in vector format is changed into image data in raster format.

As described above, performance (data processing performance) of data processing performed on target data by the data processor 10, e.g., image processing performance of image processing on image data which is the target data, depends on the vectorization ratio of the target data. Therefore, the scheme selecting unit 20 selects a processing scheme for target data on the basis of the vectorization ratio (a desirable example of a compression ratio) which indicates the degree of compression of the target data, and the data processor 10 performs data processing on the target data by using the selected processing scheme.

As illustrated in FIG. 1, the scheme selecting unit 20 includes the performance predicting unit and the scheme determining unit. For example, the performance predicting unit predicts data processing performance for each candidate on the basis of the vectorization ratio of the target data. The scheme determining unit compares data processing performances for multiple candidates with one another, and selects a processing scheme for the target data from among the multiple candidates.

Figure 8:
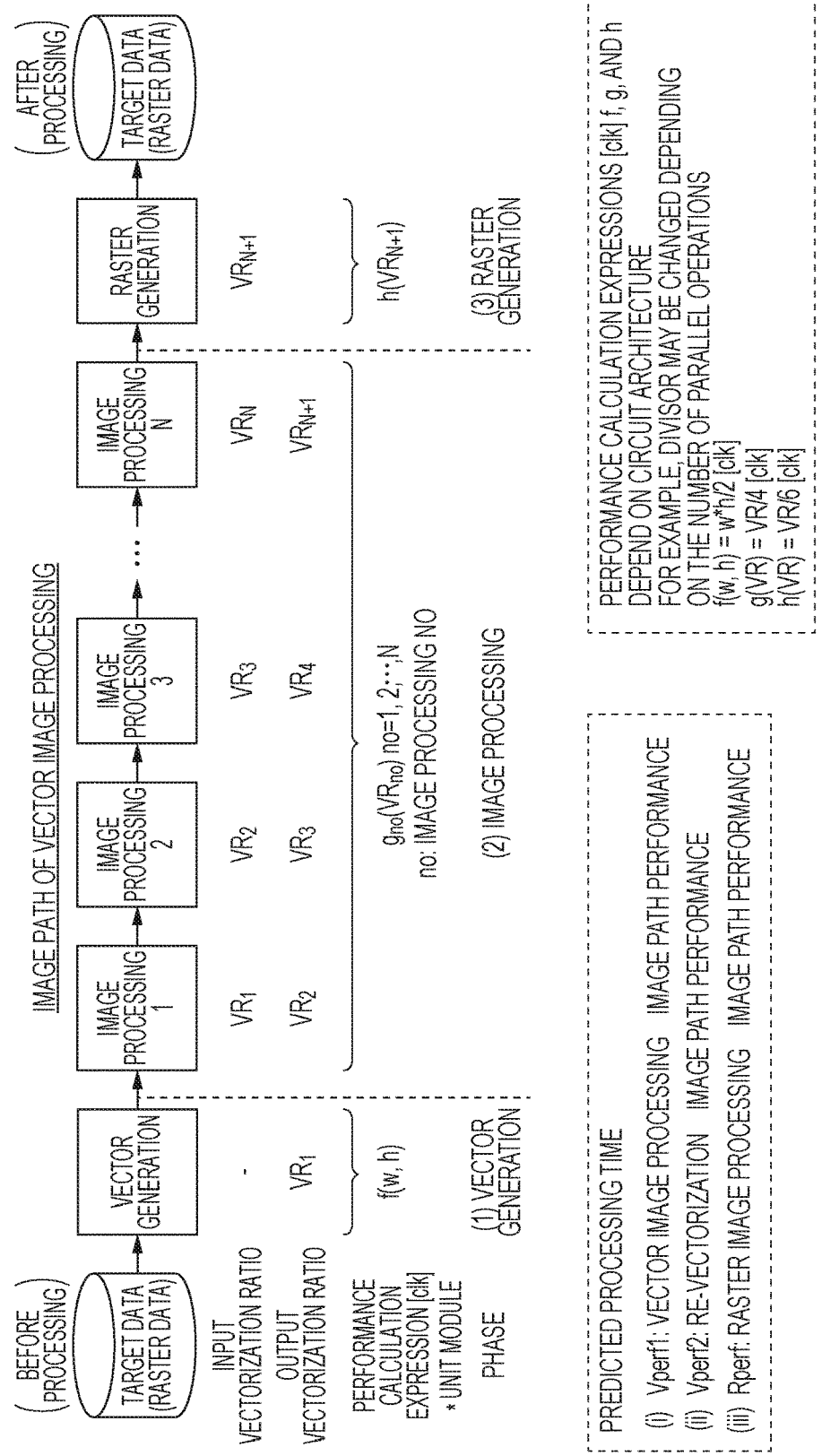
FIG. 8 is a diagram for describing an exemplary algorithm for selecting a processing scheme.

FIG. 8 is a diagram for describing an exemplary algorithm for selecting a processing scheme. FIG. 8 illustrates an example in which a processing scheme is selected in multi-stage data processing performed on target data.

In the example in FIG. 8, target data (image data) is subjected to multi-stage data processing constituted by vector generation, image processing operations 1 to N (N is a natural number), and raster generation. The target data before the processing is image data in raster format, and is compressed into data (vector data) in vector format through vector generation. The vectorization ratio after the vector generation is represented by $VR_1$. The target data which has been converted into a vector is sequentially subjected to the multiple image processing operations 1 to N. The vectorization ratio obtained when the target data is input to each image processing N is represented by $VR_N$. The vectorization ratio obtained when the target data is output from the image processing N is represented by $VR_{N+1}$. The target data is expanded into data (raster data) in raster format through raster generation. Thus, the target data after the processing is image data in raster format.

The scheme selecting unit 20 predicts data processing performance from the vectorization ratio of the target data in each stage of data processing performed in multiple stages, and determines a processing scheme for the target data. The prediction of data processing performance utilizes a performance calculation expression which is used to calculate performance and which corresponds to a corresponding stage of data processing.

For example, the vector generation utilizes f(w, h) as a performance calculation expression. That is, an evaluation value f(w, h) for data processing performance in the vector generation is calculated from the horizontal size w (for example, the number of pixels in the horizontal direction) and the vertical size h (for example, the number of pixels in the vertical direction) of image data which is the target data.

The multiple image processing operations 1 to N utilize $g_{no}(VR_{no})$ as a performance calculation expression. That is, for each image processing no (no=1, 2, . . . , N), an evaluation value $g_{no}(VR_{no})$ for data processing performance for the image processing no is calculated from the input vectorization ratio $VR_{no}$ for the image processing no.

The raster generation utilizes $h(VR_{N+1})$ as a performance calculation expression. That is, an evaluation value $h(VR_{N+1})$ for data processing performance in the raster generation is calculated from the vectorization ratio $VR_{N+1}$ for the vector data that is to be subjected to the raster generation.

Data processing performance includes a data processing speed. For example, an evaluation value obtained from a performance calculation expression desirably reflects a data processing speed. As a matter of course, in addition to a data processing speed or instead of a data processing speed, for example, power consumption, a circuit size, or the like which is required for data processing may be regarded as data processing performance, and an evaluation value reflecting the power consumption or the circuit size may be calculated by using a performance calculation expression.

The scheme selecting unit 20 uses the above-described performance calculation expressions to predict data processing performance. The scheme selecting unit 20 predicts data processing performance for each stage (each phase) of data processing performed in multiple stages.

For example, in a stage in which the data processor 10 is to perform the vector generation on the target data (when the vector generation is to be performed), for example, before the vector generation is performed, the scheme selecting unit 20 uses Expression 1 to predict data processing performance obtained after the vector generation.

(1) Prediction of performance in the later stages which is performed when the vector generation is to be performed (Expression 1)

$$Vperf1 = f(w, h) + \sum_{n=1}^{N} gv_n(VR_n) + h(VR_{N+1}) \quad \text{(i)}$$

(ii) None $$Rperf = \sum_{n=1}^{N} gr_n(w, h) \quad \text{(iii)}$$

In a stage in which the data processor 10 is to perform image processing no on the target data (when image processing is to be performed), for example, before the image processing no is performed, the scheme selecting unit 20 uses Expression 2 to predict data processing performance obtained after the image processing no.

(2) Prediction of performance in the later stages which is performed when image processing is to be performed (Expression 2)

$$Vperf1 = \sum_{n=no}^{N} gv_n(VR_n) + h(VR_{N+1}) \quad \text{(i)}$$

$$VR_{no} = Rr_{no}(VR_{no}) \cdot Vperf2 = \sum_{n=no}^{N} gv_n(VR_n) + h(VR_{N+1}) \quad \text{(ii)}$$

$$Rperf = h(VR_{no}) + \sum_{n=no}^{N} gr_n(w, h) \quad \text{(iii)}$$

In a stage in which the data processor 10 is to perform the raster generation on the target data (when the raster generation is to be performed), for example, before the raster generation is performed, the scheme selecting unit 20 uses Expression 3 to predict data processing performance obtained after the raster generation.

(3) Prediction of performance in the later stages which is performed when the raster generation is to be performed (Expression 3)

$$Vperf1 = h(VR_{N+1}) \quad (i)$$

$$VR_{N+1} = Rr_{N+1}(VR_{N+1}), Vperf2 = h(VR_{N+1}) \quad (ii)$$

$$Rperf = h(VR_{N+1}) \quad (iii)$$

In Expressions 1 to 3, Vperf1 represents a prediction value for data processing performance obtained by using a vector image processing scheme (exemplary compression processing scheme) in which vectorized image data is subjected to image processing. Vperf2 represents a prediction value for data processing performance obtained by using re-vectorization processing scheme (exemplary re-compression scheme) in which image data is subjected to re-vectorization processing and is then subjected to image processing. Rperf represents a prediction value for data processing performance obtained by using a raster image processing scheme (exemplary expansion processing scheme) in which image data is expanded into raster format and is then subjected to image processing.

The scheme selecting unit 20 compares the prediction values for data processing performance which are obtained by using Expressions 1 to 3, and determines a processing scheme for the target data (image data) for each stage (each phase). For example, when the vector generation is to be performed, Expression 1 is used. If Vperf1 indicates the highest performance (for example, the highest speed), the vector image processing scheme is selected. If Rperf indicates the highest performance (for example, the highest speed), the raster image processing scheme is selected. When the vector generation is to be performed, no image processing has been performed, and the vectorization ratio has not been decreased due to the image processing. Therefore, the re-vectorization processing scheme is not a candidate for the selection.

When the vector generation is to be performed, if the vector image processing scheme is selected, the data processor 10 vectorizes image data which is the target data in raster format, through the vector generation, and then performs vector image processing. For example, after the vector image processing scheme is selected, a circuit for the vector generation and a circuit for the vector image processing are formed through reconfiguration in the reconfigurable circuit. In contrast, if the raster image processing scheme is selected, the data processor 10 skips the vector generation, and performs raster image processing on the target data in raster format. For example, after the raster image processing scheme is selected, a circuit for the raster image processing is formed through reconfiguration in the reconfigurable circuit. Alternatively, after the vector generation, the raster generation (rasterisation) may be performed on image data which is the target data, so as to convert the image data into raster format. Then, the raster image processing may be performed.

When image processing is to be performed, Expression 2 is used. If Vperf1 indicates the highest performance (for example, the highest speed), the vector image processing scheme is selected. If Vperf2 indicates the highest performance (for example, the highest speed), the re-vectorization processing scheme is selected. If Rperf indicates the highest performance (for example, the highest speed), the raster image processing scheme is selected.

When image processing is to be performed, if the vector image processing scheme is selected, the data processor 10 performs the vector image processing on image data in vector format. For example, after the vector image processing scheme is selected, a circuit for the vector image processing is formed through reconfiguration in the reconfigurable circuit. If the re-vectorization processing scheme is selected, the data processor 10 performs the re-vectorization processing on image data in vector format, and then performs the vector image processing. For example, after the re-vectorization processing scheme is selected, a circuit for the re-vectorization processing and a circuit for the vector image processing are formed through reconfiguration in the reconfigurable circuit. If the raster image processing scheme is selected, the data processor 10 performs the raster generation (rasterisation) on image data in vector format, and then performs the raster image processing. For example, after the raster image processing scheme is selected, a circuit for the raster generation and a circuit for the raster image processing are formed through reconfiguration in the reconfigurable circuit.

When the raster generation is to be performed, Expression 3 is used. If Vperf1 indicates the highest performance (for example, the highest speed), the vector image processing scheme is selected. If Vperf2 indicates the highest performance (for example, the highest speed), the re-vectorization processing scheme is selected. If Rperf indicates the highest performance (the highest speed), the raster image processing scheme is selected.

When the raster generation is to be performed, if the vector image processing scheme is selected, the data processor 10 performs the raster generation processing (rasterisation processing) on image data in vector format. For example, after the vector image processing scheme is selected, a circuit for the raster generation is formed through reconfiguration in the reconfigurable circuit. If the re-vectorization processing scheme is selected, the data processor 10 performs the re-vectorization processing on image data in vector format, and then performs the raster generation processing. For example, after the re-vectorization processing scheme is selected, a circuit for the re-vectorization processing and a circuit for the raster generation are formed through reconfiguration in the reconfigurable circuit. If the raster image processing scheme is selected, the data processor 10 performs the raster generation processing (rasterisation processing) on image data in vector format. When the raster generation is to be performed, no image processing is performed in a later stage, and there is no difference between the vector image processing scheme and the raster image processing scheme. Therefore, one of the vector image processing scheme and the raster image processing scheme may be removed from the selection candidates.

An exemplary algorithm for selecting a processing scheme is described above. Prediction of a change in vectorization ratio in each stage of data processing will be described.

Figure 9A:
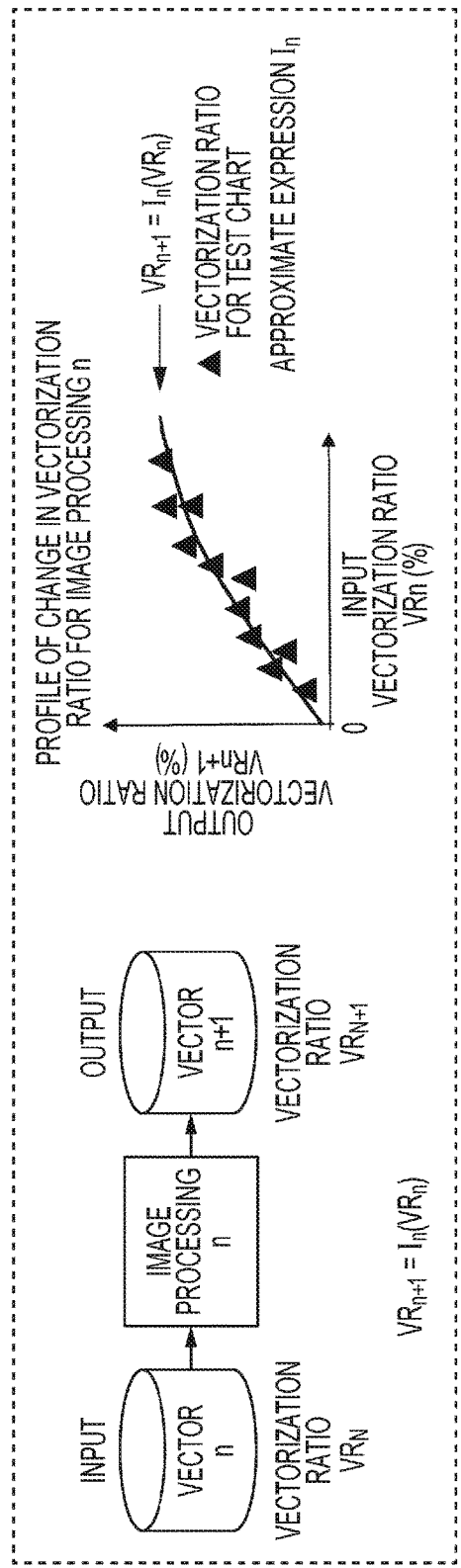
FIGS. 9A and 9B are diagrams for describing exemplary prediction of a change in vectorization ratio.
Figure 9B:
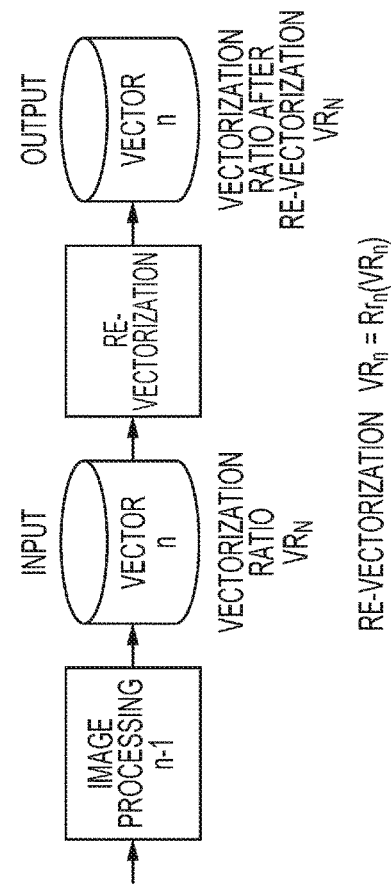

FIGS. 9A and 9B are diagrams for describing exemplary prediction of a change in vectorization ratio. FIG. 9A illustrates an example in which, for each vector image processing n (n=1, 2, ..., N), the output vectorization ratio $VR_{n+1}$ is predicted from the input vectorization ratio $VR_n$. For example, for each vector image processing n, image data of a test chart is used in advance, whereby a profile (approximate expression In) indicating a relationship between input vectorization ratio and output vectorization ratio is prepared. The scheme selecting unit 20 uses the profile (approximate expression In) prepared in advance for each vector image processing n, so as to predict the output vectorization ratio $VR_{n+1}$ from the input vectorization ratio $VR_n$ for each vector image processing n. The output vectorization ratio $VR_{n+1}$ obtained through such prediction is used, for example, in the algorithm in FIG. 8.

FIG. 9B illustrates an example in which, for the re-vectorization processing, the vectorization ratio obtained after the processing is predicted from the vectorization ratio obtained before the processing. For the re-vectorization processing, similarly to the case of each vector image processing n, for example, image data of a test chart is used in advance, whereby a profile (approximate expression $Rr_n$) indicating a relationship between input vectorization ratio before the re-vectorization processing and output vectorization ratio after the re-vectorization processing is prepared. The scheme selecting unit 20 uses the profile (approximate expression $Rr_n$) which is prepared in advance, so as to predict the vectorization ratio $Rr_n(VR_n)$ after the re-vectorization processing from the vectorization ratio $VR_n$ before the re-vectorization processing. The predicted vectorization ratio $Rr_n(VR_n)$ after the processing is used, for example, in the algorithm in FIG. 8.

Figure 10:
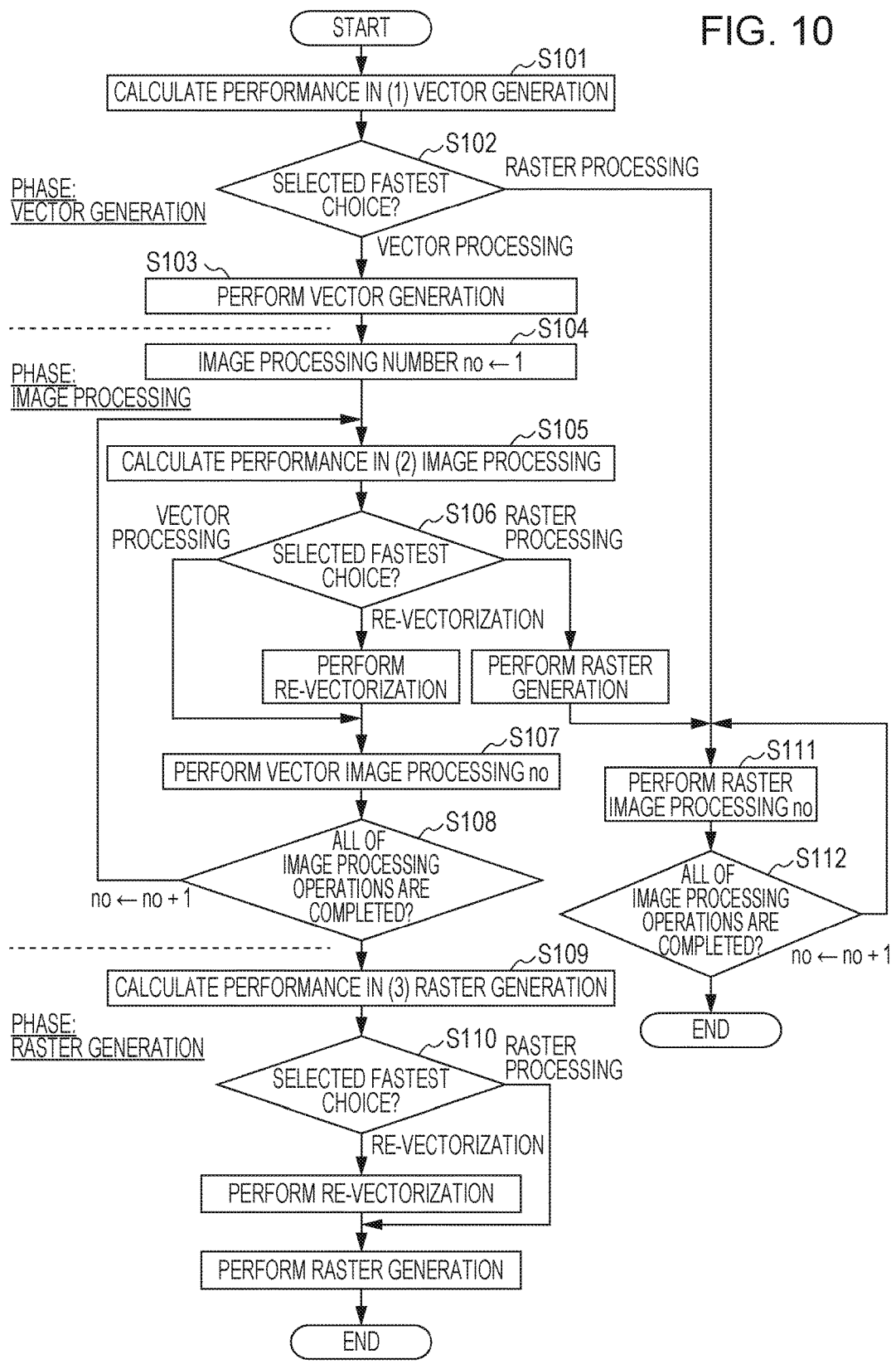
FIG. 10 is a flowchart in which processes performed by the data processing apparatus in FIG. 1 are summarized.

FIG. 10 is a flowchart in which processes performed by the data processing apparatus in FIG. 1 are summarized. At start of data processing, data processing performance obtained when the vector generation is to be performed is predicted (S101). That is, the scheme selecting unit 20 uses Expression 1 to predict data processing performance obtained after the vector generation. By using Expression 1, prediction values for data processing performance for the multiple candidates are compared with each other, and a processing scheme achieving the highest performance (for example, the highest speed) is selected (S102).

In S102, if the raster image processing scheme is selected, the raster image processing no is performed (S111). That is, the data processor 10 forms, through reconfiguration, a circuit for the raster image processing no in the reconfigurable circuit, and performs the raster image processing on the target data (image data) in raster format. Until all of the image processing operations (no=1 to N) are completed, the raster image processing is performed on the image data that is to be processed and that remains in raster format (S112). If all of the image processing operations are completed, the data processing for the image data is ended.

In contrast, in S102, if the vector image processing scheme is selected, the target data (image data) in raster format is subjected to the vector generation so as to be converted into vector format (S103). That is, the data processor 10 forms, through reconfiguration, a circuit for the vector generation in the reconfigurable circuit, and performs the vector generation on the target data (image data) in raster format.

Subsequently, the image processing number no is initialized to 1 (S104). Data processing performance at image processing is predicted (S105). That is, the scheme selecting unit 20 uses Expression 2 to predict data processing performance obtained after the image processing no. By using Expression 2, prediction values for data processing performance for the multiple candidates are compared with one another, and a processing scheme achieving the highest performance (for example, the highest speed) is selected (S106).

In S106, if the raster image processing scheme is selected, the target data (image data) in vector format is subjected to the raster generation so as to be converted to raster format, and the raster image processing no is performed (S111). That is, the data processor 10 forms, through reconfiguration, a circuit for the raster generation and a circuit for the raster image processing no in the reconfigurable circuit, expands the image data in vector format into raster format, and then performs the raster image processing on the image data. Until all of the image processing operations (no=1 to N) are completed, the raster image processing is performed on the image data that remains in raster format (S112). If all of the image processing operations are completed, the data processing for the image data is ended.

In S106, if the vector image processing scheme is selected, the vector image processing no is performed on the target data (image data) that remains in vector format (S107). That is, the data processor 10 forms, through reconfiguration, a circuit for the vector image processing no in the reconfigurable circuit, and performs the vector image processing on the image data in vector format.

In S106, if the re-vectorization processing scheme is selected, the target data (image data) in vector format is subjected to the re-vectorization processing, and is then subjected to the vector image processing no (S107). That is, the data processor 10 forms, through reconfiguration, a circuit for the re-vectorization processing and a circuit for the vector image processing no in the reconfigurable circuit, performs the re-vectorization processing on the image data in vector format, and then performs the vector image processing.

Until all of the image processing operations (no=1 to N) are completed, the processes from S105 to S107 are repeatedly performed (S108). If all of the image processing operations are completed, data processing performance obtained when the raster generation is to be performed is predicted (S109). That is, the scheme selecting unit 20 uses Expression 3 to predict data processing performance obtained after the raster generation. By using Expression 3, prediction values for data processing performance for the multiple candidates are compared with one another, and a processing scheme achieving the highest performance (for example, the highest speed) is selected (S110).

In S110, if the re-vectorization processing scheme is selected, the target data (image data) in vector format is subjected to the re-vectorization processing, and is then subjected to the raster generation processing. That is, the data processor 10 forms, through reconfiguration, a circuit for the re-vectorization processing and a circuit for the raster generation in the reconfigurable circuit, performs the re-vectorization processing on the image data in vector format, and performs the raster generation processing. Then, the data processing for the image data is ended.

In S110, if the raster image processing scheme is selected, the target data (image data) in vector format is not subjected to the re-vectorization processing, and is subjected to the raster generation processing. That is, the data processor 10 forms, through reconfiguration, a circuit for the raster generation processing in the reconfigurable circuit, and performs the raster generation processing without performing the re-vectorization processing on the image data in vector format. Then, the data processing for the image data is ended.

The desirable exemplary embodiment of the present invention is described above. The above-described embodiment is merely an example in all respects, and does not limit the scope of the present invention. The present invention encompasses various modified exemplary embodiments without departing from the gist of the present invention.

What is claimed is:

1. A data processing apparatus that selects a processing scheme for target data, the data processing apparatus comprising:
a scheme selecting unit configured to select a processing scheme; and
a data processor configured to process the target data,
wherein the processing scheme is selected from among a plurality of candidates by using a degree of compression of the target data as compressed by the corresponding one of the plurality of candidates as an index, and that performs data processing on the target data by using the selected processing scheme, the plurality of candidates including a processing scheme in which data which has been compressed is subjected to the data processing, and a processing scheme in which data is expanded and then subjected to the data processing,
wherein the plurality of candidates includes a processing scheme in which data is re-compressed and then subjected to the data processing.

2. The data processing apparatus according to claim 1, wherein, by comparing data processing performances for the plurality of candidates with one another, each of the data processing performances being predicted for a corresponding one of the plurality of candidates from a compression ratio indicating the degree of compression of the target data as compressed by the corresponding one of the plurality of candidates, the processing scheme for the target data is selected from the plurality of candidates.

3. The data processing apparatus according to claim 1, wherein, by comparing data processing performances for the plurality of candidates with one another, each of the data processing performances being predicted for a corresponding one of the plurality of candidates from a compression ratio indicating the degree of compression of the target data as compressed by the corresponding one of the plurality of candidates, the processing scheme for the target data is selected from the plurality of candidates.

4. The data processing apparatus according to claim 1, wherein,
wherein the plurality of candidates include a compression processing scheme, an expansion processing scheme, and a re-compression scheme, the compression processing scheme being a scheme in which data which has been compressed is subjected to the data processing, the expansion processing scheme being a scheme in which data is expanded and then subjected to the data processing, the re-compression scheme being a scheme in which data is re-compressed and then subjected to the data processing,
wherein the scheme selecting unit compares data processing performances for the plurality of candidates with one another, each of the data processing performances being predicted for a corresponding one of the plurality of candidates from a compression ratio of the target data as compressed by the corresponding one of the plurality of candidates, and selects a processing scheme for the target data from among the plurality of candidates, and
wherein the data processor performs the data processing on the target data by using the selected processing scheme.

5. The data processing apparatus according to claim 1, wherein,
wherein the plurality of candidates include a compression processing scheme, an expansion processing scheme, and a re-compression scheme, the compression processing scheme being a scheme in which data which has been compressed is subjected to the data processing, the expansion processing scheme being a scheme in which data is expanded and then subjected to the data processing, the re-compression scheme being a scheme in which data is re-compressed and then subjected to the data processing,
wherein the scheme selecting unit compares data processing performances for the plurality of candidates with one another, each of the data processing performances being predicted for a corresponding one of the plurality of candidates from a compression ratio of the target data as compressed by the corresponding one of the plurality of candidates, and selects a processing scheme for the target data from among the plurality of candidates, and
wherein the data processor performs the data processing on the target data by using the selected processing scheme.

6. The data processing apparatus according to claim 2, wherein,
wherein the plurality of candidates include a compression processing scheme, an expansion processing scheme, and a re-compression scheme, the compression processing scheme being a scheme in which data which has been compressed is subjected to the data processing, the expansion processing scheme being a scheme in which data is expanded and then subjected to the data processing, the re-compression scheme being a scheme in which data is re-compressed and then subjected to the data processing,
wherein the scheme selecting unit compares the data processing performances for the plurality of candidates with one another, each of the data processing performances being predicted for a corresponding one of the plurality of candidates from the compression ratio of the target data as compressed by the corresponding one of the plurality of candidates, and selects a processing scheme for the target data from among the plurality of candidates, and
wherein the data processor performs the data processing on the target data by using the selected processing scheme.

7. The data processing apparatus according to claim 3, wherein,
wherein the plurality of candidates include a compression processing scheme, an expansion processing scheme, and a re-compression scheme, the compression processing scheme being a scheme in which data which has been compressed is subjected to the data processing, the expansion processing scheme being a scheme in which data is expanded and then subjected to the data processing, the re-compression scheme being a scheme in which data is re-compressed and then subjected to the data processing,
wherein the scheme selecting unit compares the data processing performances for the plurality of candidates with one another, each of the data processing performances being predicted for a corresponding one of the plurality of candidates from the compression ratio of the target data as compressed by the corresponding one of the plurality of candidates, and selects a processing scheme for the target data from among the plurality of candidates, and wherein the data processor performs the data processing on the target data by using the selected processing scheme.

8. The data processing apparatus according to claim 4, wherein the data processor includes
   a reconfigurable circuit that is capable of forming, through reconfiguration,
      a compressed-data processing circuit that processes compressed data,
      an expansion circuit that expands the compressed data,
      an expanded-data processing circuit that processes expanded data, and
      a re-compression circuit that re-compresses data,
   wherein, when the compression processing scheme is selected, a circuit configuration including the compressed-data processing circuit is formed through reconfiguration in the reconfigurable circuit,
   wherein, when the expansion processing scheme is selected, a circuit configuration including the expansion circuit and the expanded-data processing circuit is formed through reconfiguration in the reconfigurable circuit, and
   wherein, when the re-compression scheme is selected, a circuit configuration including the re-compression circuit and the compressed-data processing circuit is formed through reconfiguration in the reconfigurable circuit.

9. The data processing apparatus according to claim 5, wherein the data processor includes
   a reconfigurable circuit that is capable of forming, through reconfiguration,
      a compressed-data processing circuit that processes compressed data,
      an expansion circuit that expands the compressed data,
      an expanded-data processing circuit that processes expanded data, and
      a re-compression circuit that re-compresses data,
   wherein, when the compression processing scheme is selected, a circuit configuration including the compressed-data processing circuit is formed through reconfiguration in the reconfigurable circuit,
   wherein, when the expansion processing scheme is selected, a circuit configuration including the expansion circuit and the expanded-data processing circuit is formed through reconfiguration in the reconfigurable circuit, and
   wherein, when the re-compression scheme is selected, a circuit configuration including the re-compression circuit and the compressed-data processing circuit is formed through reconfiguration in the reconfigurable circuit.

10. The data processing apparatus according to claim 6, wherein the data processor includes
    a reconfigurable circuit that is capable of forming, through reconfiguration,
       a compressed-data processing circuit that processes compressed data,
       an expansion circuit that expands the compressed data,
       an expanded-data processing circuit that processes expanded data, and
       a re-compression circuit that re-compresses data,
    wherein, when the compression processing scheme is selected, a circuit configuration including the compressed-data processing circuit is formed through reconfiguration in the reconfigurable circuit,
    wherein, when the expansion processing scheme is selected, a circuit configuration including the expansion circuit and the expanded-data processing circuit is formed through reconfiguration in the reconfigurable circuit, and
    wherein, when the re-compression scheme is selected, a circuit configuration including the re-compression circuit and the compressed-data processing circuit is formed through reconfiguration in the reconfigurable circuit.

11. The data processing apparatus according to claim 7, wherein the data processor includes
    a reconfigurable circuit that is capable of forming, through reconfiguration,
       a compressed-data processing circuit that processes compressed data,
       an expansion circuit that expands the compressed data,
       an expanded-data processing circuit that processes expanded data, and
       a re-compression circuit that re-compresses data,
    wherein, when the compression processing scheme is selected, a circuit configuration including the compressed-data processing circuit is formed through reconfiguration in the reconfigurable circuit,
    wherein, when the expansion processing scheme is selected, a circuit configuration including the expansion circuit and the expanded-data processing circuit is formed through reconfiguration in the reconfigurable circuit, and
    wherein, when the re-compression scheme is selected, a circuit configuration including the re-compression circuit and the compressed-data processing circuit is formed through reconfiguration in the reconfigurable circuit.

12. The data processing apparatus according to claim 4, wherein the scheme selecting unit selects a processing scheme for the target data for each stage of data processing performed in a plurality of stages, and
    wherein, in stage-by-stage execution in the plurality of stages of the data processing on the target data, the data processor performs the data processing on the target data by using the processing scheme selected for each stage.

13. A non-transitory computer readable medium storing a program causing a computer to execute a process comprising:
    selecting a processing scheme for target data from among a plurality of candidates by using a degree of compression of the target data as compressed by the corresponding one of the plurality of candidates as an index, the plurality of candidates including a processing scheme in which data which has been compressed is subjected to data processing, and a processing scheme in which data is expanded and then subjected to the data processing;
    and processing the target data using the selected processing scheme,
    wherein the plurality of candidates includes a processing scheme in which data is re-compressed and then subjected to the processing.

14. A data processing method comprising:
selecting a processing scheme for target data from among a plurality of candidates by using a degree of compression of the target data as compressed by the corresponding one of the plurality of candidates as an index, the plurality of candidates including a processing scheme in which data which has been compressed is subjected to data processing, and a processing scheme in which data is expanded and then subjected to the data processing;
and processing the target data using the selected processing scheme,
wherein the plurality of candidates includes a processing scheme in which data is re-compressed and then subjected to the processing.

* * * * *